(12) United States Patent
Milby

(10) Patent No.: US 6,697,794 B1
(45) Date of Patent: Feb. 24, 2004

(54) PROVIDING DATABASE SYSTEM NATIVE OPERATIONS FOR USER DEFINED DATA TYPES

(75) Inventor: Gregory Howard Milby, San Marcos, CA (US)

(73) Assignee: NCR Corporation, Dayton, OH (US)

( * ) Notice: Subject to any disclaimer, the term of this patent is extended or adjusted under 35 U.S.C. 154(b) by 320 days.

(21) Appl. No.: 09/795,736

(22) Filed: Feb. 28, 2001

(51) Int. Cl.[7] ............................................. G06F 17/30
(52) U.S. Cl. ................................... 707/2; 707/102
(58) Field of Search ............................ 707/1–10, 102

(56) References Cited

U.S. PATENT DOCUMENTS

| | | | | |
|---|---|---|---|---|
| 6,208,993 B1 | * | 3/2001 | Shadmon | 707/102 |
| 6,285,996 B1 | * | 9/2001 | Jou et al. | 707/2 |
| 6,338,056 B1 | * | 1/2002 | Dessloch et al. | 707/2 |
| 6,421,656 B1 | * | 7/2002 | Cheng et al. | 707/2 |
| 6,584,459 B1 | * | 6/2003 | Chang et al. | 707/3 |

* cited by examiner

Primary Examiner—Greta Robinson
Assistant Examiner—Sathyanarayan Pannala
(74) Attorney, Agent, or Firm—Baker Botts LLP

(57) ABSTRACT

A method and computer program for providing a database system native operation for a data element which has a user defined data type (UDT). The method and computer program include assigning a data type, which is supported by the database system native operation, to an alias. The method and computer program further include processing the data element to produce the alias, linking the alias to the data element, and performing the database system native operation using the alias.

10 Claims, 9 Drawing Sheets

PROVIDING DATABASE SYSTEM NATIVE OPERATIONS FOR USER DEFINED DATA TYPES

BACKGROUND

A release of a new standard for the Structured Query Language (SQL), SQL-99, has increased the need to add object relational features to existing database system (DBS) commercial products. One of the SQL-99 object relational features is the User Defined Type (UDT). The UDT feature provides users of the DBS product the ability to define their own data types (the UDTs) install them into the DBS, and to use them as part of their DBS schema design (e.g., as a column in a database table).

To make full use of UDTs, it would be helpful if the DBS provided performance at a level similar to that provided by DBS vendor developed system defined types, such as the INTEGER type. For example, it would be helpful in many database systems if UDTs were supported by such DBS-native operations as building a DBS index on a UDT, gathering statistics regarding a UDT, and redistributing base table rows on the basis of the UDT. Providing such services becomes more of a challenge when it is realized that UDTs may be Large Object UDTs (LOB-UDTs), such as Video UDTs, Audio UDTs, and Satellite Raster UDTs. For example, building an index based on an LOB-UDT, without dedicating large amounts of storage to copies of the LOB-UDTs is a significant challenge.

SUMMARY

In general, in one aspect, the invention features a method for providing a database system native operation for a data element which has a user defined data type (UDT). The method includes assigning a data type, which is supported by the database system native operation, to an alias. The method further includes processing the data element to produce the alias, linking the alias to the data element, and performing the database system native operation using the alias.

Implementations of the invention may include one or more of the following. The database system native operation may be one of building an index based on the data element, gathering statistics regarding the data element, or redistributing rows of a base table based on the data element. Assigning a data type may include assigning an integer data type to the alias. The data element may include fields and processing the data element to produce the alias may include computing a checksum for a field of the data element. Linking the alias to the data element may include building a record which includes the alias and a pointer to the data element. Performing the database system native operation using the alias may include building an index using the alias, gathering statistics using the alias, or hashing using the alias.

In general, in another aspect, the invention features a computer program, stored on a tangible storage medium, for providing a database system native operation for a data element which has a user defined data type (UDT). The program includes executable instructions that cause the computer to assign a data type, which is supported by the database system native operation, to an alias. The program further includes executable instructions that cause the computer to process the data element to produce the alias, link the alias to the data element, and perform the database system native operation using the alias.

Implementations of the invention may include one or more of the following. The data element may include fields and, in processing the data element to produce the alias, the computer may compute a checksum for a field of the data element. In linking the alias to the data element, the computer may build a record which includes the alias and a pointer to the data element. In performing the database system native operation using the alias, the computer may build an index using the alias, gather statistics using the alias, or hash using the alias.

In general, in another aspect, the invention features a database system for accessing a database with a data element which has a user defined data type (UDT). The database system includes a massively parallel processing system, which includes one or more nodes. The database system includes a plurality of CPUs. Each of the one or more nodes provides access to one or more CPUs. The database system also includes a plurality of virtual processes. Each of the one or more CPUs provides access to one or more virtual processes. Each virtual process is configured to manage data stored in one of a plurality of data-storage facilities.

The database system includes a parsing engine. The parsing engine includes a session control, which controls access to the plurality of virtual processes. The parsing engine includes a parcer, which interprets and optimizes a command for access to a database to produce a series of steps to be performed. The parsing engine includes a dispatcher, which controls the sequence of the series of steps and determines which of the plurality of virtual processes will perform each of the series of steps. The parcer includes an optimizer which optimizes a plan for executing the series of steps. The optimizer includes a process for getting a type for an alias for the UDT data element; and a process for getting the alias for the UDT data element.

Implementations of the invention may include one or more of the following. The process for getting the type may return an integer type. The UDT data element may include a Binary Large Object (BLOB) and the process for getting the alias may include computing a checksum for a value of the BLOB. The UDT data element may include a ROW ID and a value and the optimizer may further include an indexer for indexing a record including the alias and the ROW ID into an indexing construct using the alias as the indexing key. The optimizer may further include a process for selecting a record matching a search UDT data element from an indexing construct including using the process for getting a type for the search alias for the search UDT data element, using the process for getting the search alias for the search UDT data element, and retrieving one or more records from the indexing construct which are indexed by the search alias. The one or more retrieved records may include pointers to respective one or more UDTs. The process for selecting the record matching the search UDT data element may further include selecting the one UDT pointed to by the one or more retrieved records that best matches the search UDT.

The optimizer may include a histogram process for building a histogram using the alias, or a frequency search process using the alias. The UDT data element may include a ROW ID and a value. The optimizer may include a hashing process for hashing a record including the alias and the ROW ID using the alias as the hashing key.

One or more of the virtual processes may include a process for getting a type for an alias for the UDT data element, and a process for getting the alias for the UDT data element.

Other features and advantages will become apparent from the description and claims that follow.

DETAILED DESCRIPTION

DBS native operations for UDTs, which are otherwise unavailable, are provided by computing a key, or "alias," to represent the value of the UDT in the DBS native operation. The data type of the alias is generally not the same as the data type of the UDT being represented. The data type of the alias is chosen to be one for which the DBS provides the desired database native operations.

For example, suppose that the UDT for which a DBS native operation is desired is a LOB-UDT, specifically a Video UDT and that the DBS does not support the desired native operation for Video UDTs, but the DBS does support the desired native operation for Integer variables. To provide the desired native operation for the Video UDT, an Integer is associated with each Video UDT and the desired native operation is applied to the Integer, all the while maintaining the association between the Integer and its respective Video UDT. Through this technique, the desired native operation is provided for Video UDTs.

Figure 1:
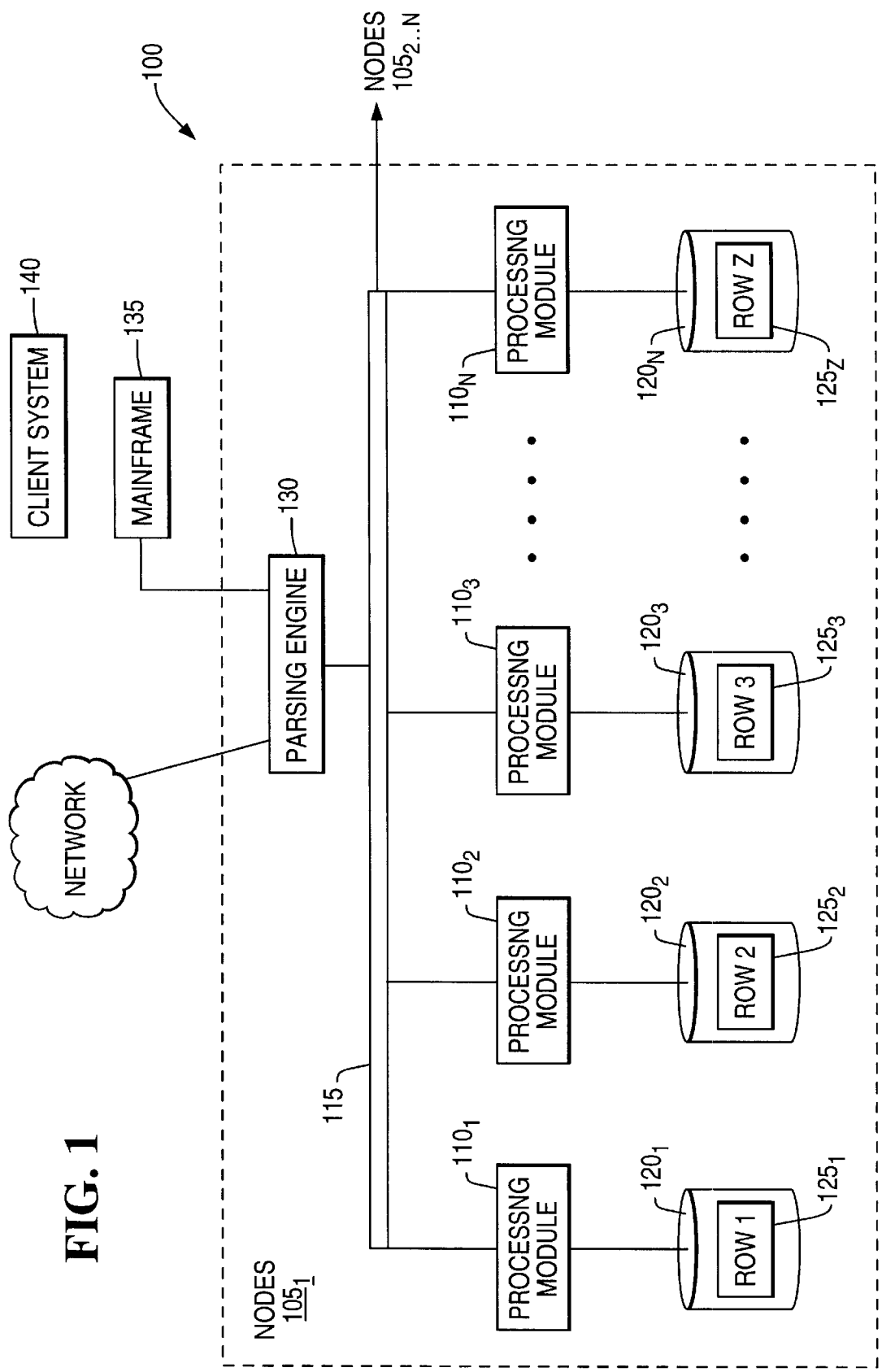
FIG. 1 is a block diagram of a database system.

This technique has particular application to large databases which might contain many millions or billions of records using a DBS 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual running on one or more physical processors.

For the case in which one or more virtual processors are running on a single physical processor, the single physical processor swaps between the set of N virtual processors.

For the case in which N virtual processors are running on a M-processor node, the node's operating system schedules the N virtual processors to run on its set of M physical processors. If there are 4 virtual processors and 4 physical processor, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

As described below, the system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries in a standard format, such as SQL.

Figure 2:
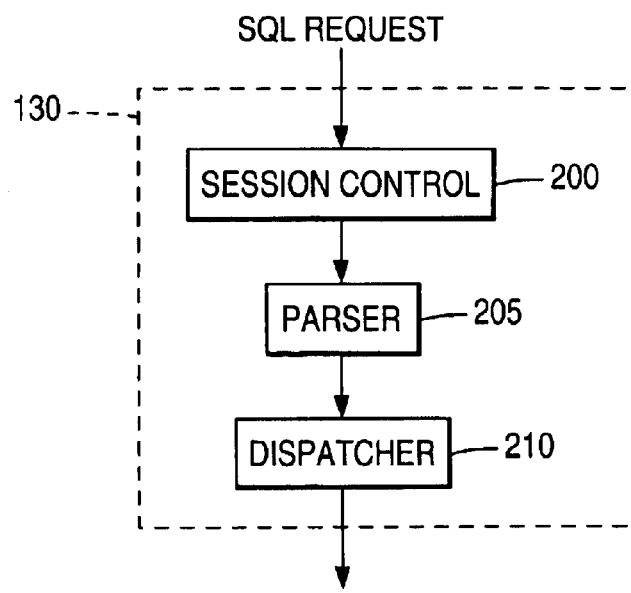
FIG. 2 is a block diagram of a parsing engine.

In one example system, the parsing engine 130 is made up of three components: a session control 200, a parcer 205, and a dispatcher 210, as shown in FIG. 2. The session control 200 provides the logon and logoff function. It takes a request for authorization to access the database, verifies it, and then either allows or disallows the access.

Figure 3:
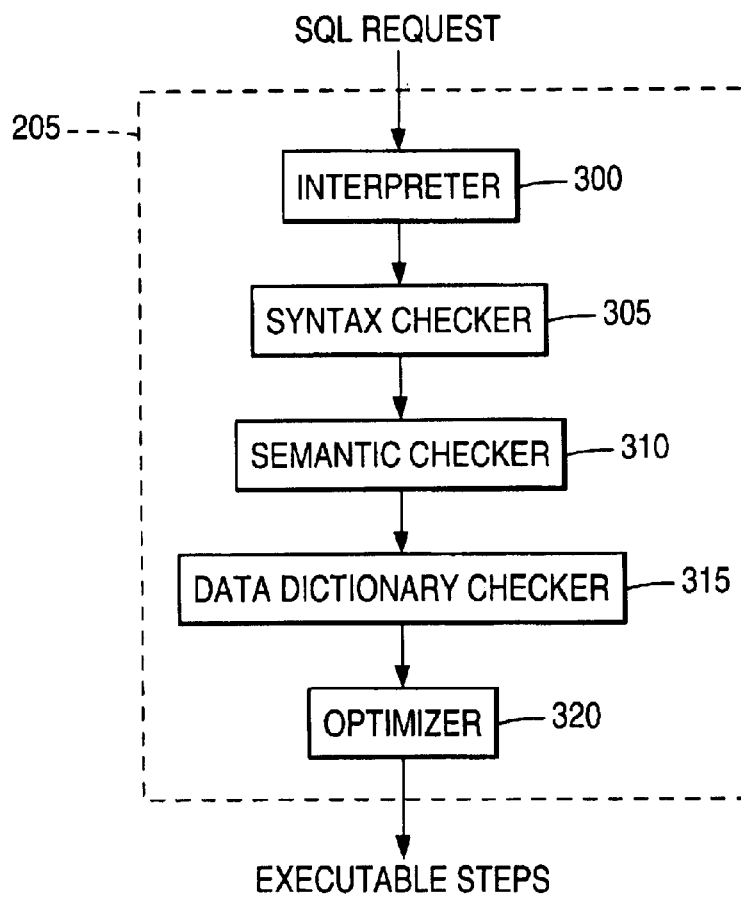
FIG. 3 is a block diagram of a parcer.

Once the session control 200 allows a session to begin, a user may submit a SQL request, which is routed to the parcer 205. As illustrated in FIG. 3, the parcer 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parcer 205 runs an optimizer (block 320), which develops the least expensive plan to perform the request.

A DBS such as that illustrated in FIGS. 1–3 provides certain native operations including, in particular, indexing, collecting statistics, and redistributing or hashing. These particular DBS native operations are frequently invoked by the optimizer 320. For example, when joining multiple tables, the optimizer may use statistics gathered from the tables to decide the order that the tables will be joined. Further, the DBS native operations may be invoked by one of the processing modules $110_{1 \ldots N}$. For example, if a SQL query is received containing the clause: "where T1.x=T2.y," the optimizer may decide to hash table T2 on column y prior to performing the join on the condition "T1.x=T2.y". To accomplish the hash, each of the processing modules $110_{1 \ldots N}$ would retrieve its portion of the T2 table and apply the hash native operation to the y column.

These particular DBS native operations are not typically available for UDTs. The aliasing technique described herein expands the DBS native operations to include UDTs.

In a traditional approach to indexing, the value being indexed is the same value that is used as the key for the index. Inserts into the indexing structure are accomplished by first forming pairs of the form, <value, rowid> for each DBS column value being indexed, where "rowid" identifies the row associated with the value being indexed. The resulting pair is then inserted into the index.

For example, to build an index on a social security number (ssn) DBS column which was declared as, "ssn Integer", a designer would create entries of the form: <ssn1, rowid1>, <ssn2, rowid2>, etc., where the ssn values are the actual integer values in the ssn column and the DBS rowids are the row identifiers of the rows containing the ssn values. The entries would then be inserted into the index.

With the aliasing approach, the designer defines an indexing key data type which generally differs from the data type of the value actually being indexed. Thus, instead of forming <value, rowid> pairs to be inserted, the designer forms <alias, rowid> pairs, which are inserted into the index.

The technique of designating an alias UDT data type to serve as an indexing key is especially useful in those cases in which the UDT is a LOB-UDT. If the traditional <value, rowid> approach were employed, the LOB-UDT values would have to be inserted into the index, potentially wasting enormous amounts of storage space and slowing down index navigation routines.

Figure 4:
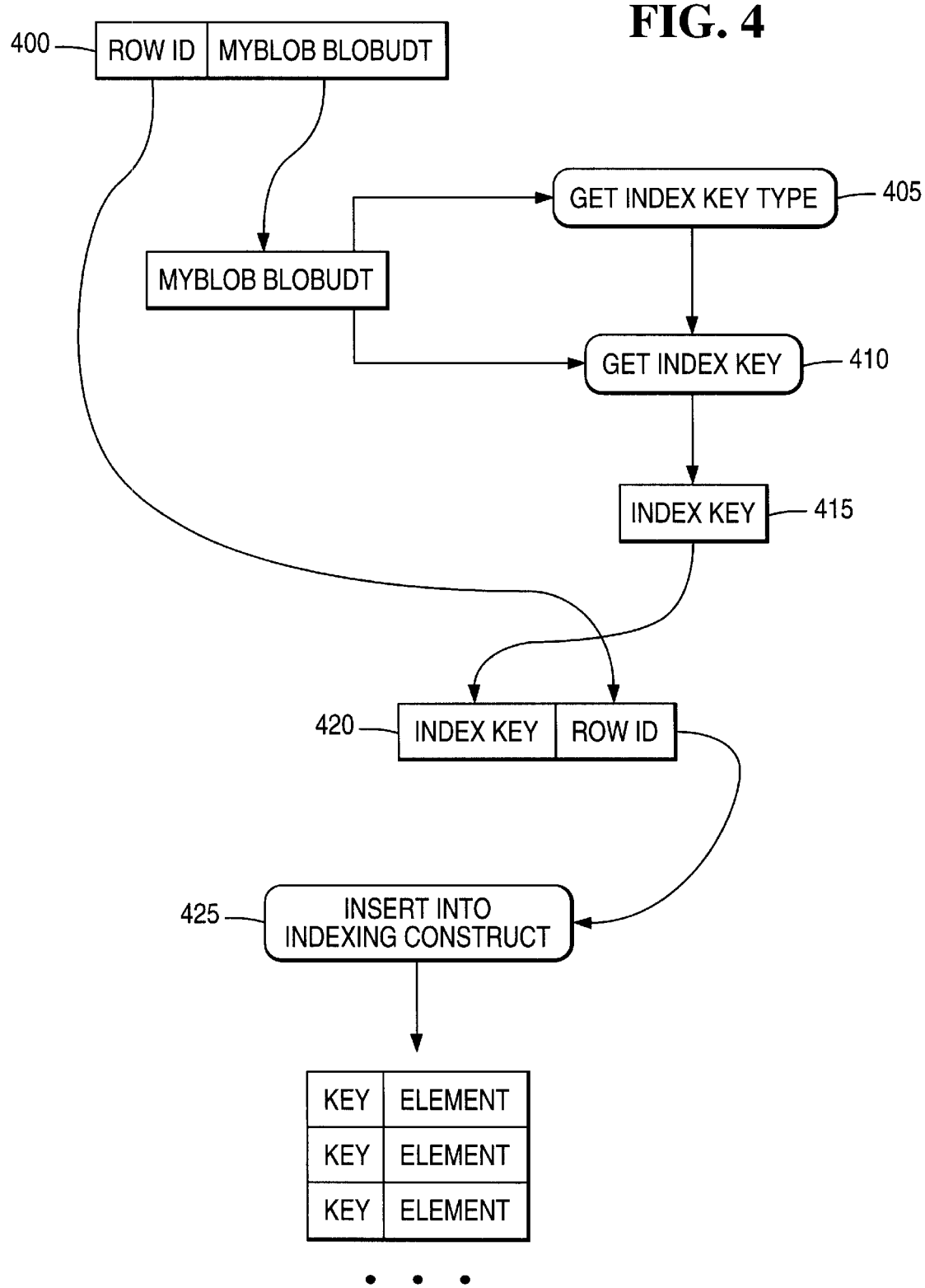
FIG. 4 is a flow chart of an indexing system for a UDT.

Consider an example in which a Customer wants to store binary LOBs (BLOBs) in its database, and frequently look for the condition when T1.Blobs1=BLOB(:MyBlob). An example record 400 in table T1, illustrated in FIG. 4, would have the form <rowid, MyBlob BlobUDT>. For this example, one BLOB is defined to be equal to another BLOB when their respective binaries are exactly equivalent. The expression, "T1.Blobs1=BLOB(:MyBlob)" is known as an "explicit term," which is exactly the type of term that benefits from indexing.

Assume that, in this example, the UDT developer decides that the Customer's application is best served by making the checksum of the BLOB serve the role of being the representative indexing key. This is only one way of deriving an indexing key. Persons of ordinary skill will understand without further elaboration that many other ways of deriving the index key are possible depending on the content of the UDT and the application.

Figure 5:
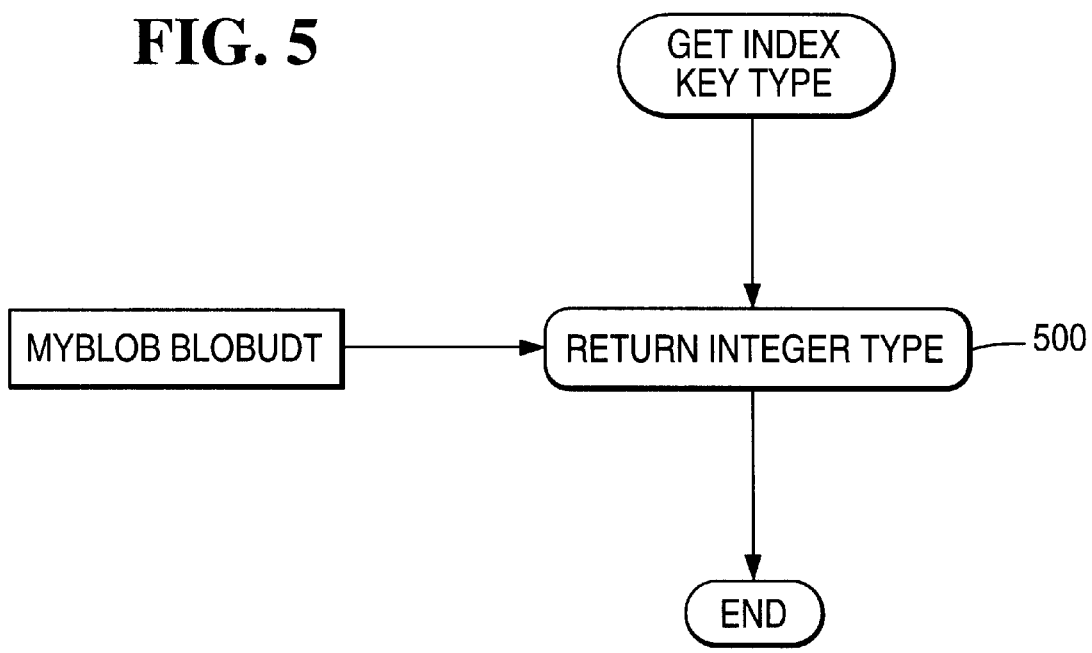
FIG. 5 is a flow chart of a get index key type process.
Figure 6:
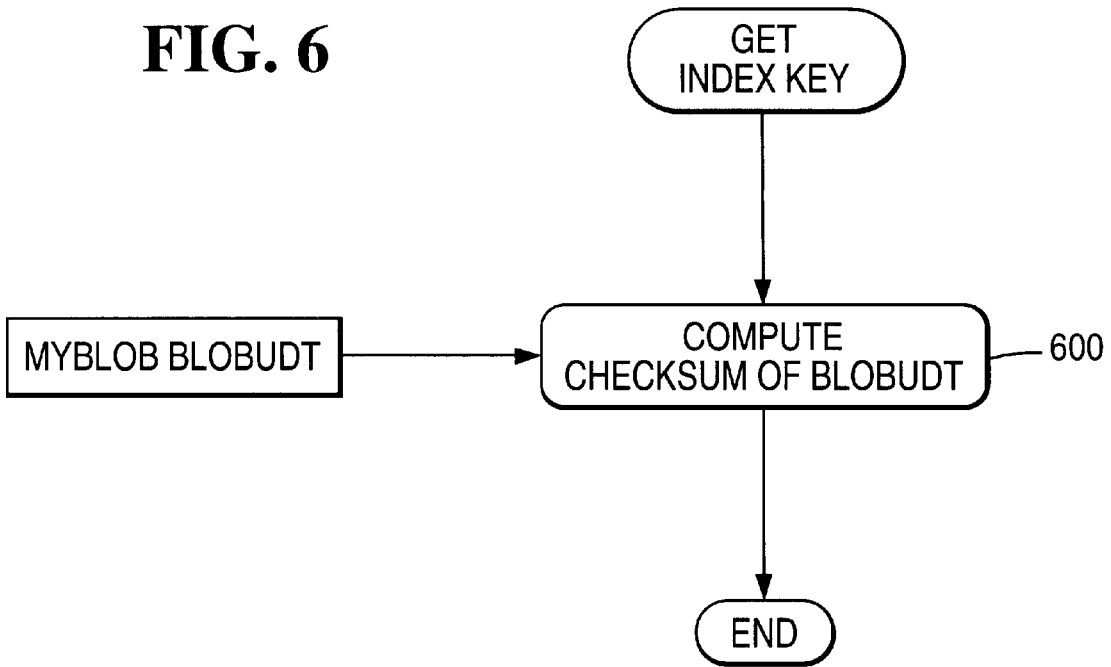
FIG. 6 is a flow chart of a get index key process.

To produce the indexing key in this example, the UDT developer authors a getIndexKeyType( ) aliasing routine 405. This routine returns an "Integer" type (block 500) for the BLOB UDT, as shown in FIG. 5, which is a type that can be inserted into the indexing construct (e.g., inserted into a Balanced Tree or BTree form of index) in place of the type BLOB, which cannot easily be inserted into the indexing structure. The UDT developer authors a getIndexKey( ) aliasing routine 410. In one example, illustrated in FIG. 6, this routine calls a private checksum routine (block 600) that returns an integer value INDEXKEY 415 (FIG. 4) representing the checksum of the entire binary BLOB. A record 420 is constructed from the INDEXKEY and the rowid. The record 420 is then inserted into the indexing construct (block 425).

There are special DBS considerations that should be observed when applying the aliasing approach to indexing. The aliasing approach dictates that <alias, rowid> pairs, instead of <value, rowid> pairs, will be inserted into the indexing structure. The success of applying this technique hinges upon the UDT developer's ability to select an appropriate key data type and author a getIndexKey( ) aliasing routine which returns a key which maps strongly to the UDT-value being indexed. The strength of the mapping determines the success of the index. Indexing keys will generally fall into three classifications based upon the strength of their mapping to the UDT-value they represent.

In the first classification, a one-to-one mapping relationship exists between the UDT-alias and the UDT-value. This is equivalent to the traditional approach, since there is no distinction between the <value, rowid> and <alias, rowid> representations. If "alias=alias" is true then "value=value" will also be true. Thus, to search for the row containing the UDT-value, V1, it is only necessary to invoke the getIndexKey function upon V1 to obtain the alias key for V1, "KeyV1 ", search the index for matches on KeyV1, then return the row id(s) as the row(s) containing the value V1.

Figure 7:
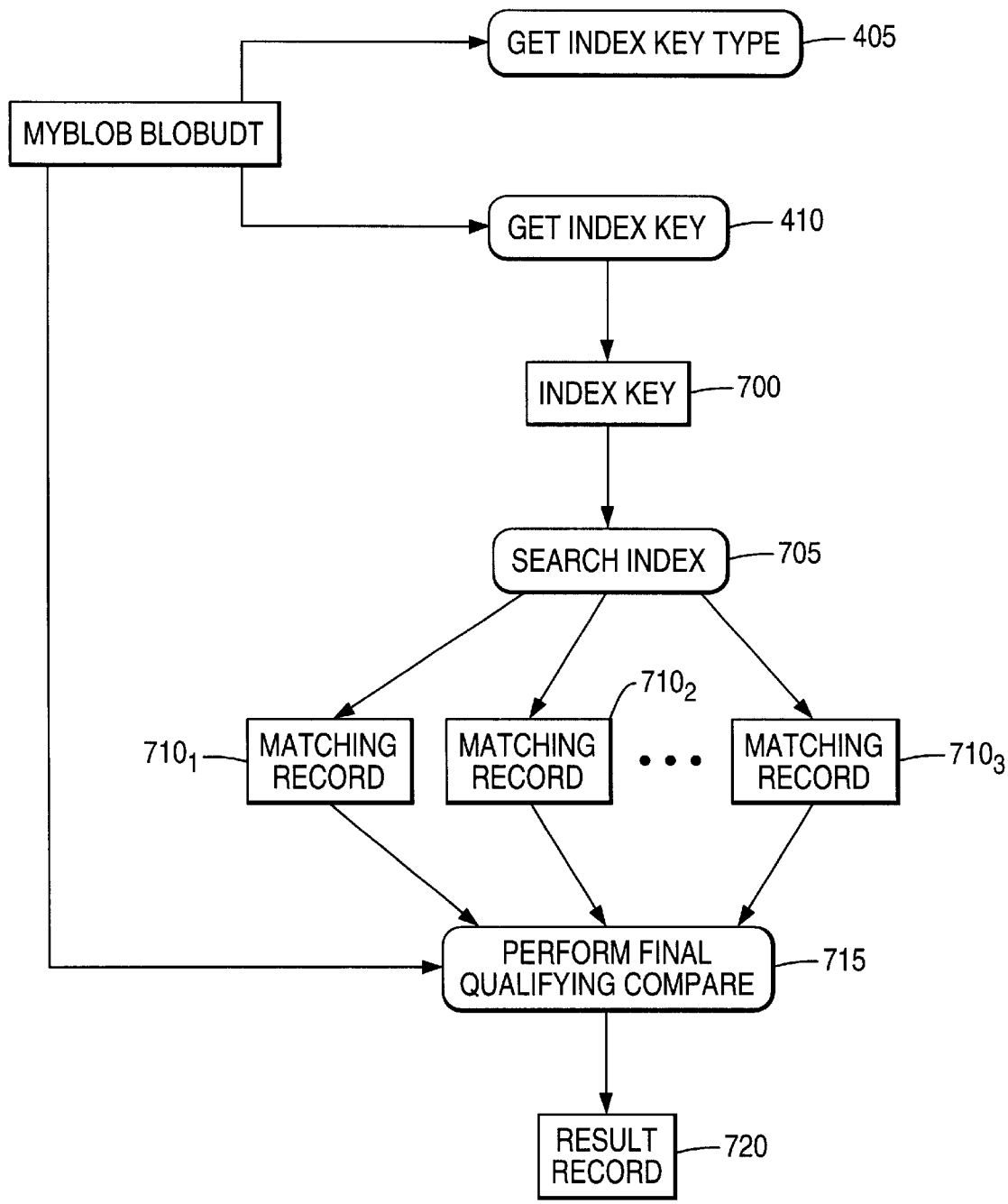
FIG. 7 is a flow chart of an index retrieval process using a fuzzy index.

In the second classification, called a "fuzzy index," a one-to-few mapping relationship exists between the UDT-alias and the UDT-value. In this classification, a matching of key values does not necessarily mean a matching of UDT-values. In other words, the relationship of "alias=alias" does not necessarily imply "value=value", and a search for <alias> may return several <alias,rowid> pairs, as illustrated in FIG. 7. In this classification, to search for the row containing the UDT-value, V1, it is first necessary to apply the getIndexKey function 410 to V1 to obtain the index key 700 for V1, "KeyV1." The index key 700 is then used to search the index for matches on KeyV1 (block 705). The search on the key value KeyV1 returns a set of <alias, rowid> pairs $710_1 \ldots _N$, where the rowid identify the set of candidate rows which potentially contain the search target UDT-value V1. A process 715 performs a final qualifying check of "V1=V1 -in-rowid?", to complete the fuzzy index search and to produce a result record 720.

In the third category, a one-to-many mapping relationship exists between the UDT-alias and the UDT-value. This may happen when the UDT developer either incorrectly selects the UDT-key data type, or miss-authors the getIndexKey( ) routine to yield an unacceptable mapping relationship. Such an index is virtually useless because it offers little advantage over an all row scan of the table.

Figure 8:
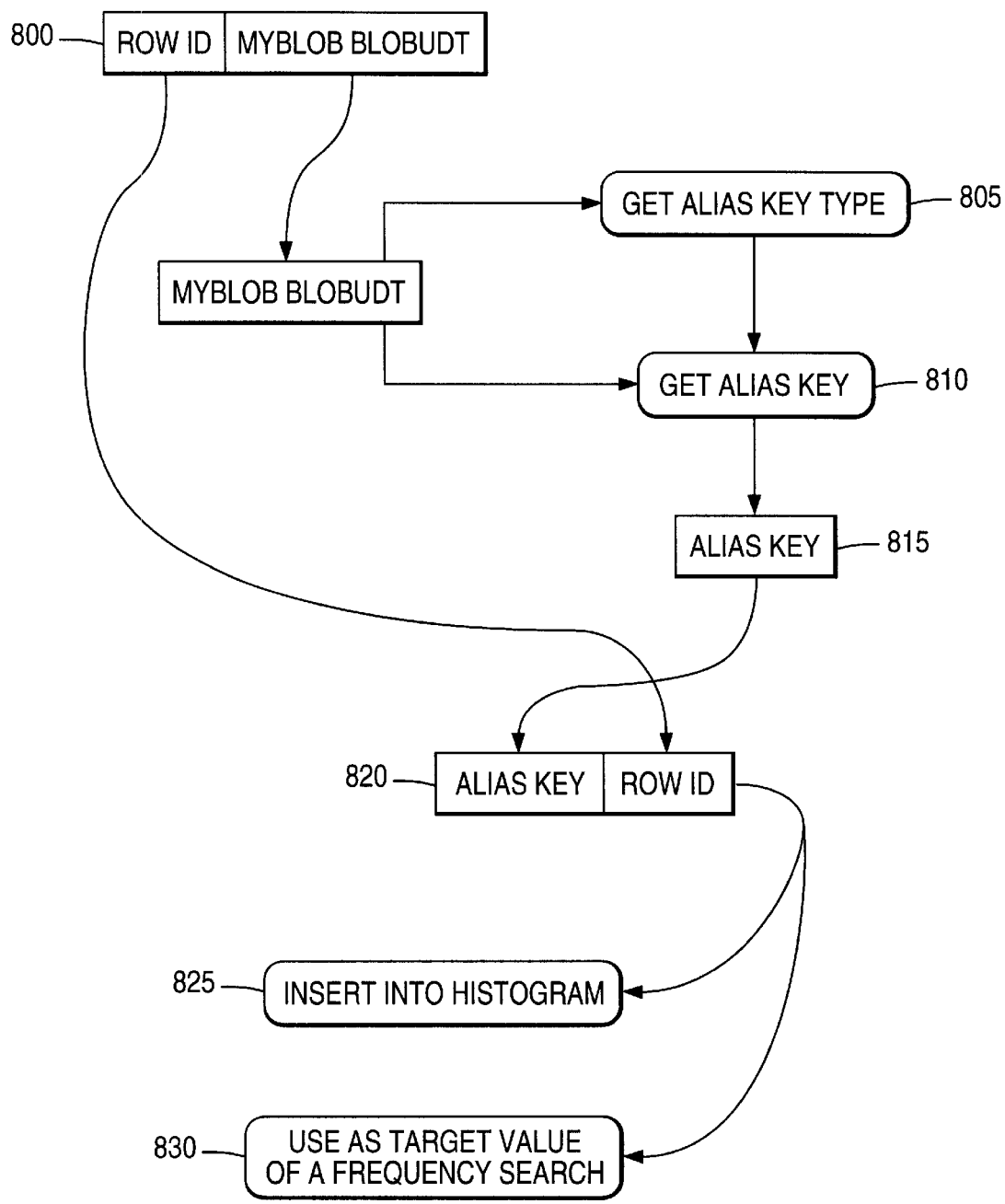
FIG. 8 is a flow chart showing the use of statistical operations with a UDT.

The aliasing technique is also useful in gathering statistics regarding UDTs, as shown in FIG. 8. In the example shown in FIG. 8, a Customer wants to store BLOBs in its database, and frequently look for the condition when T1.Blobs1= BLOB(:MyBlob). An example record 800 in table T1, illustrated in FIG. 8, would have the form <rowid, MyBlob BlobUDT>. For this example, one BLOB is defined to be equal to another BLOB when their respective binaries are exactly equivalent. As before, the expression, "T1.Blobs1= BLOB(:MyBlob)" is an "explicit term," which is exactly the type of term that benefits from statistics.

Assume that, in this example, the UDT developer decides that the Customer's application is best served by making the checksum of the BLOB serve the role of being the representative aliasing key. As before, this is only one way of deriving an indexing key. Persons of ordinary skill will understand without further elaboration that many other ways of deriving the aliasing key are possible.

Figure 9:
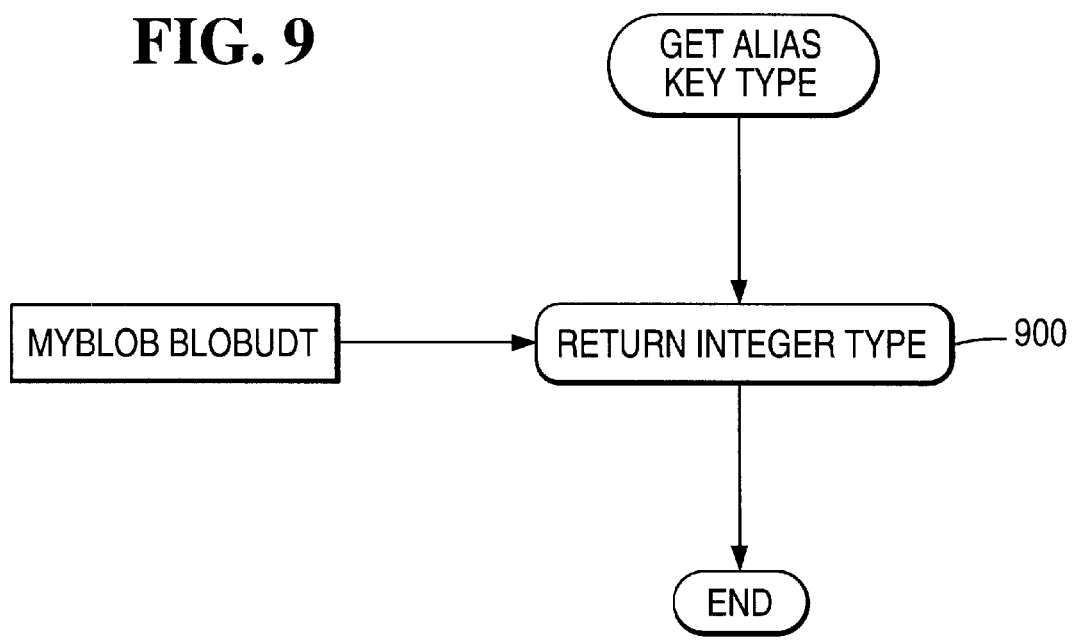
FIG. 9 is a flow chart of a get alias key type process.
Figure 10:
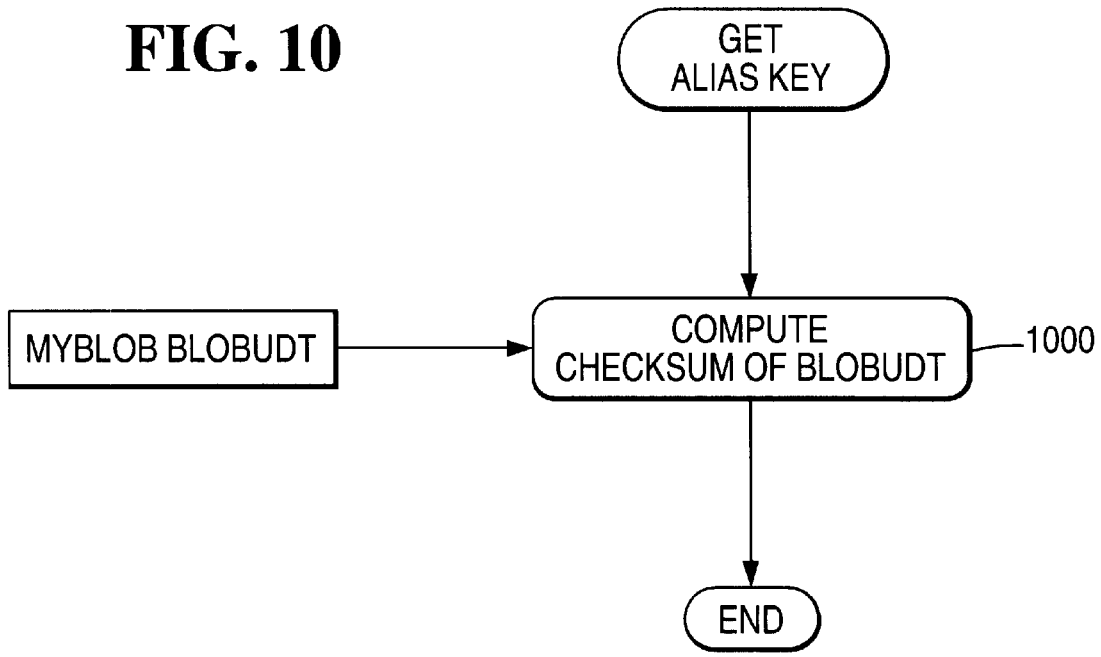
FIG. 10 is a flow chart of a get alias key process.

To produce the aliasing key in this example, the UDT developer authors a getAliasKeyType( ) aliasing routine 805. This routine returns an "Integer" type (block 900) for the BLOB UDT, as shown in FIG. 9, which is a type that can be the subject of statistics gathering in place of the type BLOB, which may not easily be the subject of statistics gathering. The UDT developer next authors a getAliasKey() aliasing routine 810. In one example, illustrated in FIG. 10, this routine calls a private checksum routine (block 1000) that returns an integer value ALIASKEY 815 (FIG. 8) representing the checksum of the entire binary BLOB. A record 820 is constructed from the ALIASKEY and the rowid. The record 820 is then inserted into the histogram (block 825) or used as the target value of a frequency search (block 830).

Figure 11:
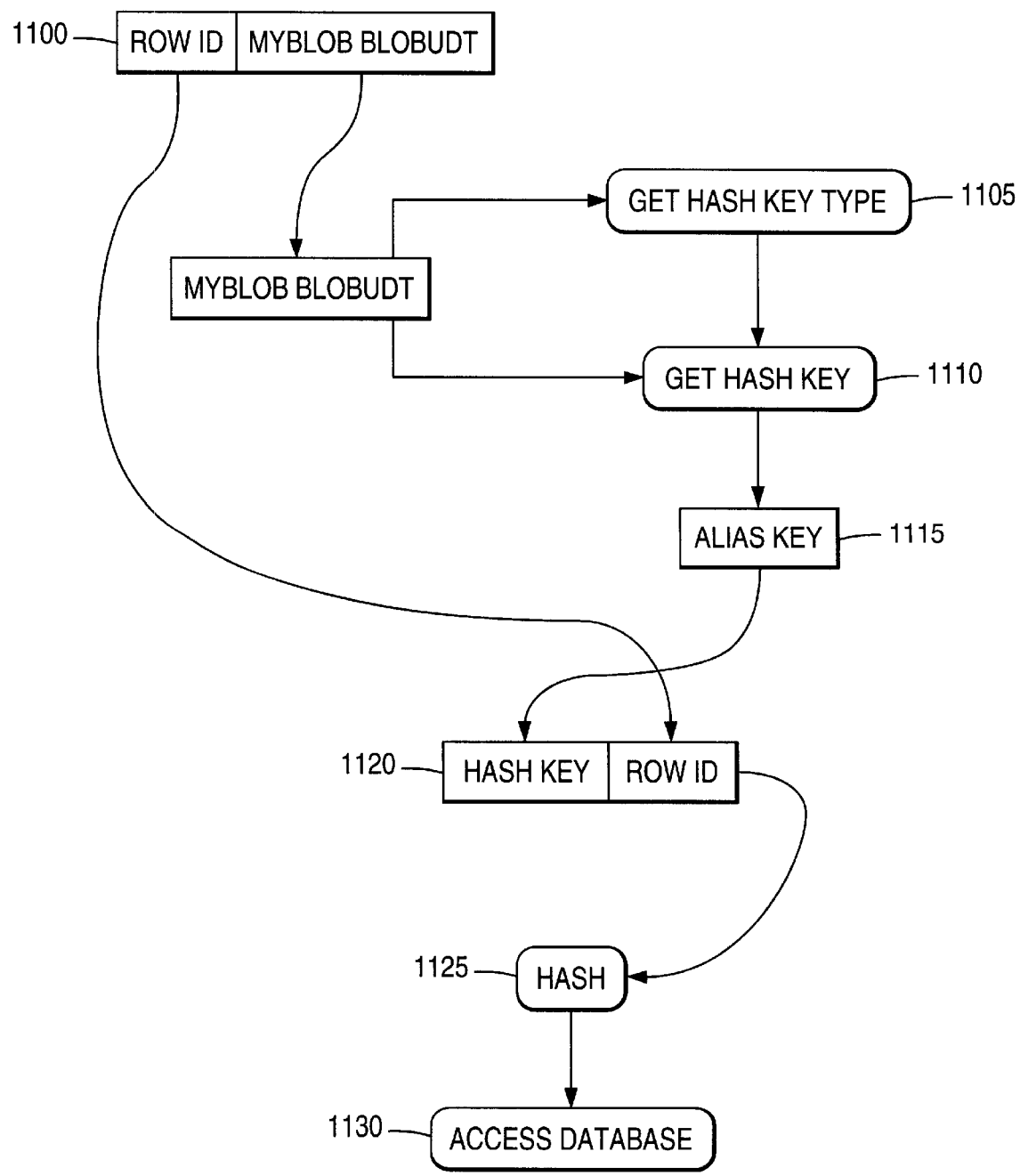
FIG. 11 is a flow chart of a hashing process.

The aliasing technique is also useful in hashing or redistributing UDTs, as shown in FIG. 11. In the example shown in FIG. 11, a Customer wants to store and retrieve BLOBs in its database, making use of the DBS native hashing/ redistribution capability. An example record 1100, illustrated in FIG. 11, would have the form <rowid, MyBlob BlobUDT>.

Assume that, in this example, the UDT developer decides that the Customer's application is best served by making the checksum of the BLOB serve the role of being the representative hash key. As before, this is only one way of deriving a hash key. Persons of ordinary skill will understand without further elaboration that many other ways of deriving the hash key are possible.

Figure 12:
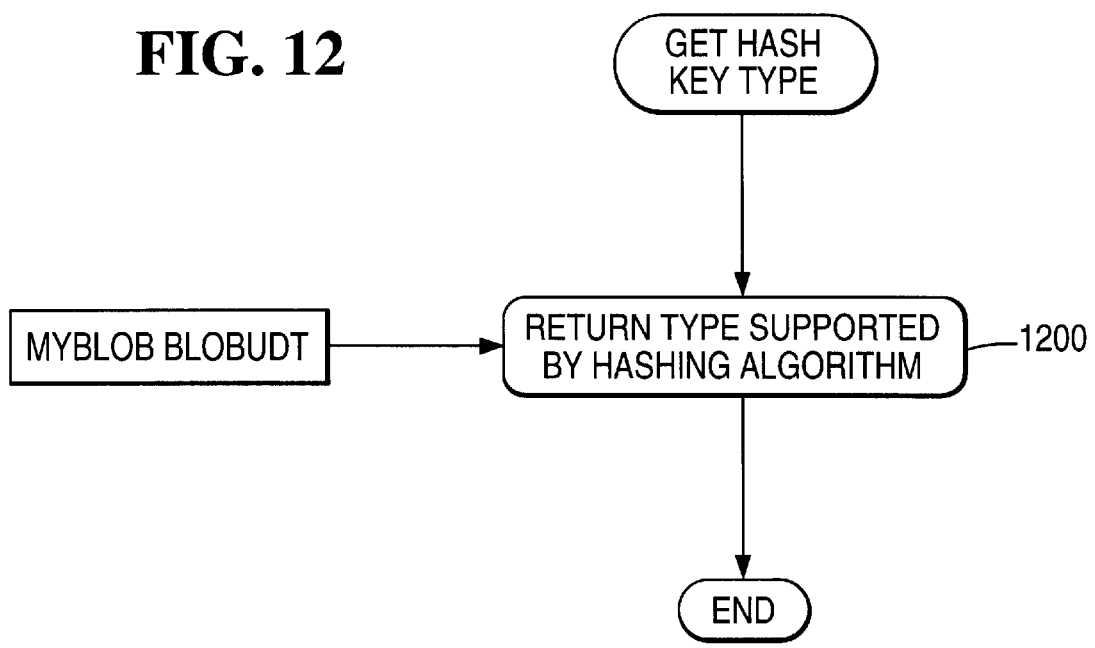
FIG. 12 is a flow chart of a get hash key type process.
Figure 13:
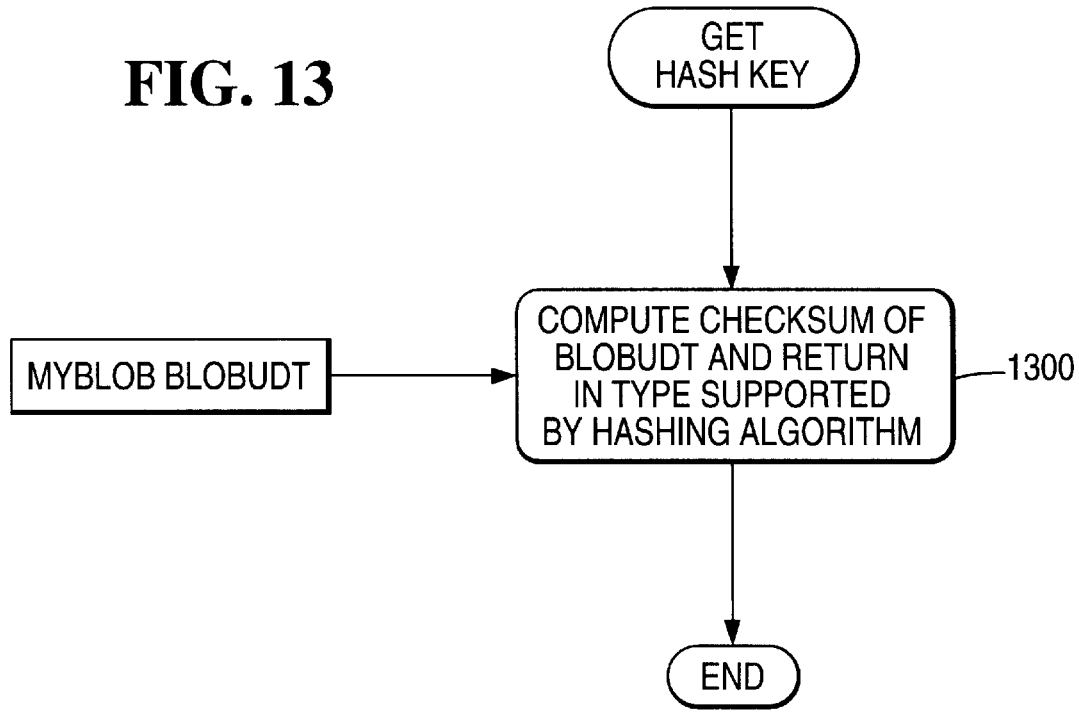
FIG. 13 is a flow chart of a get hash key process.

To produce the hash key in this example, the UDT developer authors a getHashKeyType( ) aliasing routine 1105. This routine returns a type supported by the DBS native hashing operation (block 1200) for the BLOB UDT, as shown in FIG. 12, in place of the type BLOB, which is not supported by the DBS native hashing operation. The UDT developer next authors a getHashKey( ) aliasing routine 1110. In one example, illustrated in FIG. 13, this routine calls a private checksum routine (block 1300) that returns an integer value HASHKEY 1115 (FIG. 11) representing the checksum of the entire binary BLOB. HASHKEY can be any type of variable supported by the DBS native hashing operation.

A record 1120 is constructed from the HASHKEY and the rowid. The DBS native hashing operation (block 1125) is then applied to the record 1120 and the database is accessed using the result (block 1130).

The various implementations of the invention are realized in electronic hardware, computer software, or combinations of these technologies. Most implementations include one or more computer programs executed by a programmable computer. In general, the computer includes one or more processors, one or more data-storage components (e.g volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copies into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

What is claimed is:

1. A database system for accessing a database with a data element which has a user defined data type (UDT), the database system comprising
   a massively parallel processing system comprising one or more nodes;
     a plurality of CPUs, each of the one or more nodes providing access to one or more CPUs;
     a plurality of virtual processes each of the one or more CPUs providing access to one or more virtual processes;
     each virtual process configured to manage data stored in one of a plurality of data-storage facilities;
   a parsing engine comprising
     a session control, which controls access to the plurality of virtual processes;
     a parcer, which interprets and optimizes a command for access to a database to produce a series of steps to be performed; and
     a dispatcher, which controls the sequence of the series of steps and determines which of the plurality of virtual processes will perform each of the series of steps;
   where the parcer includes
     an optimizer which optimizes a plan for executing the series of steps;
   where the optimizer includes
     a process for getting a type for an alias for the UDT data element; and
     a process for getting the alias for the UDT data element.

2. The database system of claim 1 where the process for getting the type returns an integer type.

3. The database system of claim 1 where the UDT data element comprises a Binary Large Object (BLOB) and the process for getting the alias includes computing a checksum for a value of the BLOB.

4. The database system of claim 1 where the UDT data element comprises a ROW ID and a value and the optimizer further comprises
   an indexer for indexing a record including the alias and the ROW ID into an indexing construct using the alias as the indexing key.

5. The database system of claim 1 where the UDT data element comprises a ROW ID and a value and the optimizer further comprises
   a process for selecting a record matching a search UDT data element from an indexing construct comprising
     using the process for getting a type for the search alias for the search UDT data element;
     using the process for getting the search alias for the search UDT data element; and
     retrieving one or more records from the indexing construct which are indexed by the search alias.

6. The database system of claim 5 where the one or more retrieved records include pointers to respective one or more UDTs and the process for selecting the record matching the search UDT data element further comprises
   selecting the one UDT pointed to by the one or more retrieved records that best matches the search UDT.

7. The database system of claim 1 where the optimizer further comprises a histogram process for building a histogram using the alias.

8. The database system of claim 1 where the optimizer further comprises a frequency search process using the alias.

9. The database system of claim 1 where the UDT data element comprises a ROW ID and a value and the optimizer further comprises
   a hashing process for hashing a record including the alias and the ROW ID using the alias as the hashing key.

10. The database system of claim 1 where one or more of the virtual processes include
   a process for getting a type for an alias for the UDT data element; and
   a process for getting the alias for the UDT data element.

* * * * *